A. R. FAIRFIELD.
PIPE JOINT.
APPLICATION FILED NOV. 12, 1910.
1,018,354.
Patented Feb. 20, 1912.
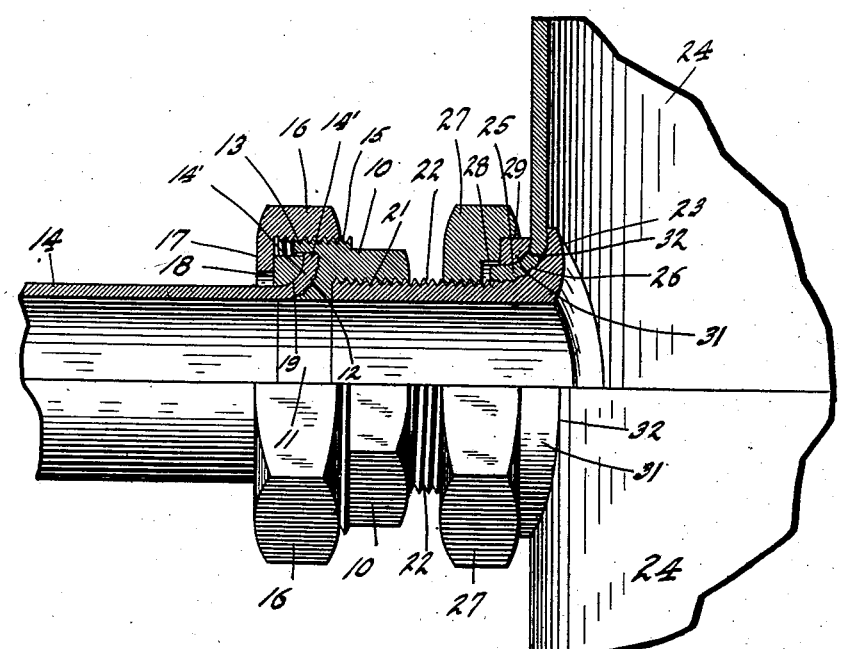
Witnesses
Frank A. Fahl
Thomas H. McMeans
Inventor
Alfred R. Fairfield,
By Bradford Hood
Attorneys

UNITED STATES PATENT OFFICE.

ALFRED R. FAIRFIELD, OF INDIANAPOLIS, INDIANA, ASSIGNOR OF ONE-THIRD TO EDWIN S. HARTER AND ONE-THIRD TO THOMAS S. HITT, BOTH OF INDIANAPOLIS, INDIANA.

PIPE-JOINT.

1,018,354.  Specification of Letters Patent.  Patented Feb. 20, 1912.

Application filed November 12, 1910. Serial No. 592,121.

*To all whom it may concern:*

Be it known that I, ALFRED R. FAIRFIELD, a citizen of the United States, residing at Indianapolis, in the county of Marion and State of Indiana, have invented a new and useful Pipe-Joint, of which the following is a specification.

The object of my invention is to produce a fitting by means of which lead or other similar ductile pipe may be readily connected together or connected to other hollow elements such as stiff pipe, cylinders, trays, etc., being especially adapted for forming a connection between a lead pipe and the side wall of a lead cylinder, such, for instance, as a lead trap.

The accompanying drawing illustrates my invention.

The single figure of the drawing is an axial section, in partial elevation, of a fitting embodying my invention and designed to form a connection between a lead pipe and a lead trap, bent ferrule, drum trap, or other cylinder.

In the drawing, 10 indicates a main tubular body having a bore 11 surrounded at one end by a curved annular seat 12, the surface of which may have annular roughenings if desired. The outer edge of the pocket 12 is overhung by an axially extending flange or wall 13 which is integral with the main body and extends for a distance somewhat in excess of the thickness of the wall of the pipe 14 to be handled. The outer face of flange 13 is provided with threads 15 adapted to receive a clamping nut 16. The nut 16 is provided with an inwardly extending flange 17 which overlaps the adjacent pocket 12 and engages a clamping ring 18 which, at its inner face 19, is formed so as to mate with the bottom of pocket 12 when at a distance therefrom substantially equal to the thickness of the pipe 14. The outer diameter of ring 18 is such as to fit neatly within flange 13.

In operation the end of pipe 14 is suitably flared, by a proper flaring tool so as to approximately fit within the pocket 12, nut 16 and ring 18 being first slipped upon the pipe. Thereupon the flaring end 14' of the pipe is seated in pocket 12, ring 18 brought up against the flaring portion with its forward edge inserted into the flange 13, and nut 16 threaded upon threads 15 and brought tightly to place, the flange 17 acting upon ring 18 to drive it firmly upon the flared portion 14' of the pipe 14 without any rubbing action. The material of the flared portion 14' of pipe 14 will, under the pressure exerted flow so as to conform to the bottom of pocket 12 and the surface 19 of ring 18, but too great an outward flow will be prevented because the end of the pipe will be definitely defined by the inner corner of pocket 12. As a consequence, the parts may be readily separated and reassembled to form a perfectly tight joint.

The threaded pocket 21 of the body 10 receives the threaded shank 22 of a tubular coupling having at its opposite end a flange 23 formed to fit the inner surface of the wall of a trap or cylindrical member 24. The member 24 is suitably perforated and the wall flared outwardly to form a flange 25 which will approximately fit the seat 26 formed in the corner between flange 23 and the tubular shank of coupling 22. Threaded on the shank 22 is a clamping nut 27 provided with an annular pocket 28 for the reception of the outer edge of the flange 25, and an annular pocket 29 for the reception of a clamping ring 31, the surface 32 of which fits the outer surface of the flange 25, the arrangement being such that ring 31 may be driven up closely into the corner between flange 25 and the cylindrical member 24 so as to drive the material of the body 24 tightly into seat 26.

I claim as my invention:

1. A pipe coupling comprising a main tubular body having an annular pipe receiving pocket formed around the end of the bore of the body, an axially extending flange flanking the pocket at its outer side, a clamping ring projected into the pocket within the outer edge of said flange and having an inner face arranged to clamp the outwardly flared end of the pipe into the pocket, means for driving said clamping ring into the pocket, a tubular coupling member threaded into the said main body opposite the pipe receiving portion, an outwardly flaring flange carried by said coupling member at its opposite end and formed to fit the inner face of the cylindrical wall of another tubular body adjacent an outwardly flared flange surrounding a perforation through said wall, a clamping nut threaded upon the shank of said coupling member, and a clamping ring rotatably seated in said nut and provided with an inner face formed to coöperate with the coupling member and its flange to clamp the outwardly flared portion of the wall of the cylinder surrounding the perforation thereof into the space between the tubular shank and flange of said coupling member.

2. A pipe coupling comprising a main tubular body having an annular pipe receiving pocket formed around the end of the bore of the body, an axially extending flange flanking the pocket at its outer side, a clamping ring projected into the pocket within the outer edge of said flange and having an inner face arranged to clamp the outwardly flared end of the pipe into the pocket, a clamping nut threaded upon the main body and engaging the clamping ring to drive the same into the pocket, a tubular coupling member threaded into the said main body opposite the pipe receiving portion, an outwardly flaring flange carried by said coupling member at its opposite end and formed to fit the inner face of the cylindrical wall of another tubular body adjacent an outwardly flared flange surrounding a perforation through said wall, a clamping nut threaded upon the shank of said coupling member, and a clamping ring rotatably seated in said nut and provided with an inner face formed to coöperate with the coupling member and its flange to clamp the outwardly flared portion of the wall of the cylinder surrounding the perforation thereof into the space between the tubular shank and flange of said coupling member.

In witness whereof, I have hereunto set my hand and seal at Indianapolis, Indiana, this seventh day of November, A. D. one thousand nine hundred and ten.

ALFRED R. FAIRFIELD. [L. S.]

Witnesses:
ARTHUR M. HOOD,
THOMAS W. McMEANS.